US010903016B2

(12) United States Patent
Ritter et al.

(10) Patent No.: US 10,903,016 B2
(45) Date of Patent: Jan. 26, 2021

(54) VOLTAGE TUNABLE MULTILAYER CAPACITOR

(71) Applicant: AVX Corporation, Fountain Inn, SC (US)

(72) Inventors: Andrew P. Ritter, Chapin, SC (US); Craig W. Nies, Greenville, SC (US); Richard VanAlstine, Piedmont, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 16/570,052

(22) Filed: Sep. 13, 2019

(65) Prior Publication Data
US 2020/0006007 A1    Jan. 2, 2020

Related U.S. Application Data

(63) Continuation of application No. 15/368,991, filed on Dec. 5, 2016, now Pat. No. 10,431,388.
(Continued)

(51) Int. Cl.
*H01G 7/06* (2006.01)
*H01G 4/232* (2006.01)
(Continued)

(52) U.S. Cl.
CPC .............. *H01G 7/06* (2013.01); *H01G 4/232* (2013.01); *H01G 4/1227* (2013.01); *H01G 4/30* (2013.01)

(58) Field of Classification Search
CPC ............ H01G 4/012; H01G 4/12; H01G 4/30; H01G 4/248; H01G 4/1227; H01G 4/008; H01G 4/228; H01G 7/06; H01G 4/232
See application file for complete search history.

(56) References Cited

U.S. PATENT DOCUMENTS 3,569,795 A *  3/1971  Gikow ..................... H01G 7/06
                                                       361/434
3,809,971 A    5/1974  Hluchan et al.
(Continued)

FOREIGN PATENT DOCUMENTS

JP       H 0878285 A      3/1996
JP       2008066682 A     3/2008
(Continued)

OTHER PUBLICATIONS

International Search Report and Written Opinion for PCT/US2016/065238 dated Mar. 15, 2017, 12 pages.
(Continued)

*Primary Examiner* — Nathan Milakovich
(74) *Attorney, Agent, or Firm* — Dority & Manning, P.A.

(57) ABSTRACT

A tunable multilayer capacitor is provided. The capacitor comprises first active electrodes that are in electrical contact with a first active termination and alternating second active electrodes that are in electrical contact with a second active termination. The capacitor also comprises first DC bias electrodes that are in electrical contact with a first DC bias termination and alternating second DC bias electrodes that are in electrical contact with a second DC bias termination. A plurality of dielectric layers are disposed between the alternating first and second active electrodes and between the alternating first and second bias electrodes. At least a portion of the dielectric layers contain a dielectric material that exhibits a variable dielectric constant upon the application of an applied voltage.

25 Claims, 15 Drawing Sheets

Related U.S. Application Data

(60) Provisional application No. 62/264,491, filed on Dec. 8, 2015, provisional application No. 62/371,520, filed on Aug. 5, 2016.

(51) Int. Cl.
*H01G 4/12* (2006.01)
*H01G 4/30* (2006.01)

(56) References Cited

U.S. PATENT DOCUMENTS

| | | |
|---|---|---|
| 5,472,935 A | 12/1995 | Yandrofski et al. |
| 5,589,845 A | 12/1996 | Yandrofski et al. |
| 5,986,864 A | 11/1999 | Davis |
| 6,187,061 B1 | 2/2001 | Amatucci et al. |
| 6,377,142 B1 | 4/2002 | Chiu et al. |
| 6,493,207 B2 | 12/2002 | Nakano et al. |
| 6,514,895 B1 | 2/2003 | Chiu et al. |
| 6,683,782 B2 | 1/2004 | Duva |
| 6,727,535 B1 | 4/2004 | Sengupta et al. |
| 6,737,179 B2 | 5/2004 | Sengupta |
| 6,774,077 B2 | 8/2004 | Sengupta et al. |
| 6,905,989 B2 | 6/2005 | Ellis et al. |
| 6,999,302 B2 | 2/2006 | Ito et al. |
| 7,145,415 B2 | 12/2006 | Sengupta et al. |
| 7,329,976 B2 | 2/2008 | Shirasu et al. |
| 7,393,604 B2 | 7/2008 | Rocke et al. |
| 7,557,055 B2 | 7/2009 | Zhang et al. |
| 7,738,237 B2 | 6/2010 | Lee |
| 7,869,187 B2 | 1/2011 | McKinzie, III |
| 7,893,561 B2 | 2/2011 | Weidenheimer et al. |
| 7,936,553 B2 * | 5/2011 | Oakes .................... H01G 2/00 361/273 |
| 8,009,407 B2 | 8/2011 | Leidl et al. |
| 8,112,852 B2 | 2/2012 | Mendolia et al. |
| 8,699,204 B2 | 4/2014 | Demcko et al. |
| 8,891,226 B2 | 11/2014 | Lee et al. |
| 9,001,486 B2 | 4/2015 | Anthony et al. |
| 9,019,679 B2 | 4/2015 | Anthony et al. |
| 9,041,491 B2 | 5/2015 | Sato et al. |
| 9,047,524 B2 | 6/2015 | Ikemoto et al. |
| 9,318,266 B2 | 4/2016 | Capanu et al. |
| 9,390,857 B2 | 7/2016 | Tan et al. |
| 9,627,141 B2 | 4/2017 | Engel et al. |
| 9,646,766 B2 | 5/2017 | Ma et al. |
| 9,728,340 B2 | 8/2017 | Ishii et al. |
| 9,859,843 B2 | 1/2018 | Charley et al. |
| 9,991,597 B2 | 6/2018 | Velandia Torres |
| 10,276,308 B2 | 4/2019 | Charley |
| 10,431,388 B2 * | 10/2019 | Ritter ..................... H01G 7/06 |
| 2004/0175585 A1 | 9/2004 | Zou et al. |
| 2004/0178867 A1 | 9/2004 | Rahman et al. |
| 2007/0030100 A1 | 2/2007 | Rhaman et al. |
| 2008/0068801 A1 | 3/2008 | Wilk |
| 2008/0199737 A1 | 8/2008 | Kazaryan et al. |
| 2009/0257167 A1 | 10/2009 | Kanno et al. |
| 2012/0112855 A1 | 5/2012 | Sato et al. |
| 2012/0219791 A1 | 8/2012 | Tan et al. |
| 2012/0235473 A1 | 9/2012 | Jiang et al. |
| 2013/0286534 A1 | 10/2013 | Ikehashi et al. |
| 2014/0247534 A1 | 9/2014 | Sato et al. |
| 2014/0312991 A1 | 10/2014 | Tan et al. |
| 2015/0325371 A1 * | 11/2015 | Hattori ................ H01G 4/385 361/301.4 |
| 2016/0268052 A1 | 9/2016 | Gando et al. |
| 2017/0162335 A1 | 6/2017 | Ritter et al. |
| 2018/0190436 A1 | 7/2018 | Duwel et al. |
| 2019/0080851 A1 * | 3/2019 | Nies .................... H01G 4/012 |
| 2019/0103228 A1 * | 4/2019 | Nies ..................... H01G 7/06 |
| 2019/0279819 A1 * | 9/2019 | Horn ..................... H01G 4/228 |
| 2019/0279820 A1 * | 9/2019 | Horn ..................... H01G 4/1227 |
| 2019/0304636 A1 * | 10/2019 | Kirk .................... H01C 7/18 |
| 2020/0211783 A1 * | 7/2020 | Cain .................... G01R 19/003 |

FOREIGN PATENT DOCUMENTS

| | | |
|---|---|---|
| JP | H 2008066682 A | 3/2008 |
| JP | 2017127081 A | 7/2017 |
| WO | WO 2015001222 A1 | 8/2015 |

OTHER PUBLICATIONS

Related Application Form, U.S. Appl. No. 16/720,069.

Dielectric Properties and Ferroelectric Phase Transition of Non-linear Tunable Barium Calcium Tin Titanate Ceramic, by Gu Huihua, Chinese Doctoral Dissertations/Masters' Theses Full-text Database (Master) Engineering Science and Technology I, Edition 09, 2006, 5 pages.

Product Information—TurboCap™ High-CV SMPS Capacitors from AVX Corporation, May 2015, 3 pages (49-51).

* cited by examiner

US 10,903,016 B2

VOLTAGE TUNABLE MULTILAYER CAPACITOR

RELATED APPLICATIONS

This present application is a continuation of U.S. Application Ser. No. 15/368,991 having a filing date of Dec. 5, 2016, which claims priority to U.S. Provisional Application Nos. 62/264,491 (filed Dec. 8, 2015) and 62/371,520 (filed Aug. 5, 2016), all of which are incorporated herein by reference for all purposes.

BACKGROUND OF THE INVENTION

Tunable capacitors have been employed in various applications that rely on the variable dielectric properties of the dielectric. For such capacitors, the capacitance at zero bias is typically near its maximum and the capacitance drops with applied voltage. The change in capacitance allows these units to be used to create tunable circuits in filters, matching networks, resonant circuits and other applications from audio to RF and microwave frequencies. Despite their benefits, the use of such capacitors has been relatively limited due in part to the relatively low capacitance values that can be achieved. As such, a need currently exists for a voltage tunable capacitor having improved properties that can be employed in a wider range of possible applications.

SUMMARY OF THE INVENTION

In accordance with one embodiment of the present invention, a tunable multilayer capacitor is disclosed that comprises first active electrodes that are in electrical contact with a first active termination and alternating second active electrodes that are in electrical contact with a second active termination. The capacitor also comprises first DC bias electrodes that are in electrical contact with a first DC bias termination and alternating second DC bias electrodes that are in electrical contact with a second DC bias termination. A plurality of dielectric layers are disposed between the alternating first and second active electrodes and between the alternating first and second bias electrodes. At least a portion of the dielectric layers contain a tunable dielectric material that exhibits a variable dielectric constant upon the application of an applied voltage.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
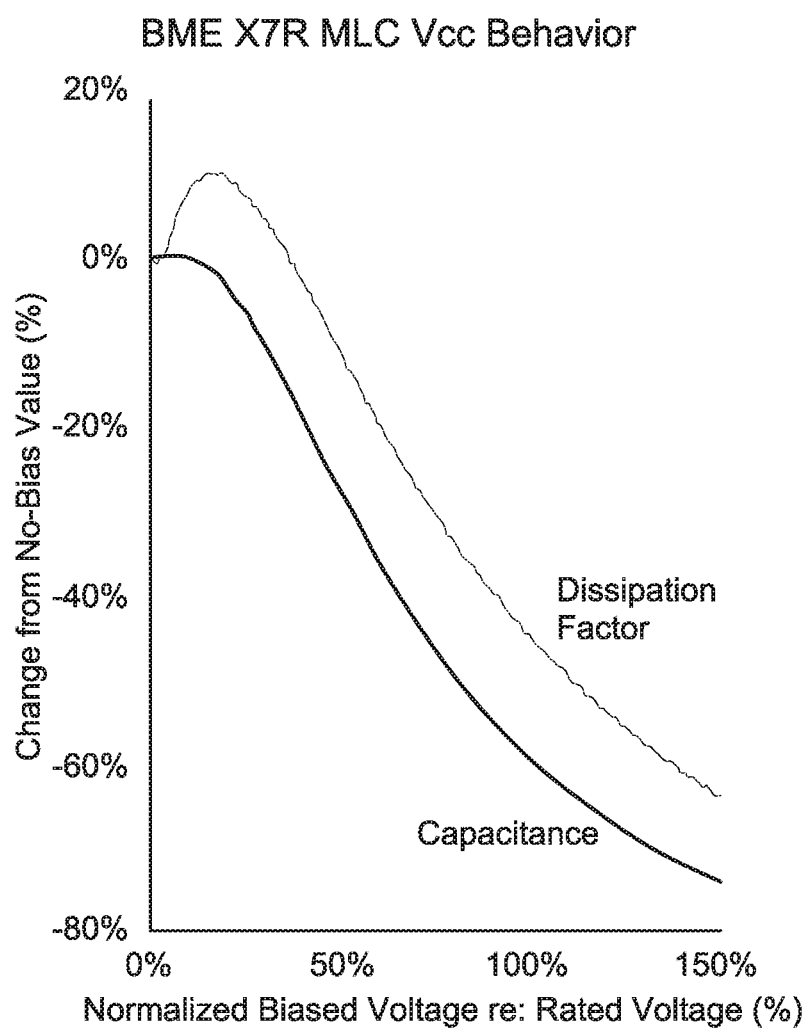
FIG. 1 graphically illustrates the change in capacitance achievable with use of the presently disclosed subject matter, over a range of normalized biasing voltage changes.

Repeat use of reference characters throughout the present specification and appended drawings is intended to represent same or analogous features, elements, or steps thereof.

DETAILED DESCRIPTION OF THE INVENTION

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a multilayer capacitor that contains a plurality of dielectric layers interposed between alternating active electrode layers. At least a portion of the dielectric layers include a tunable material that exhibits a variable dielectric constant upon the application of an applied voltage. More particularly, such materials typically have a "voltage tunability coefficient" within the range of from about 10% to about 90%, in some embodiments from about 20% to about 80%, and in some embodiments, from about 30% to about 70%, wherein the "voltage tunability coefficient" is determined according to the following general equation:

$$T = 100 \times (\varepsilon_0 - \varepsilon_V)/\varepsilon_0$$

wherein,

T is the voltage tunability coefficient;

$\varepsilon_0$ is the static dielectric constant of the material without an applied voltage; and $\varepsilon_V$ is the variable dielectric constant of the material after application of the applied voltage (DC).

The static dielectric constant of the material typically ranges from about 100 to about 25,000, in some embodiments from about 200 about 10,000, and in some embodiments, from about 500 to about 9,000, such as determined in accordance with ASTM D2149-13 at operating temperatures ranging from about −55° C. to about 150° C. (e.g., 25° C.) and frequencies ranging from about 100 Hz to about 1 GHz (e.g., 1 kHz). Of course, it should be understood that the specific value of the static dielectric constant is generally selected based on the particular application for which the capacitor is employed. When applied with an increased DC bias, the dielectric constant generally decreases within the ranges noted above. The tuning voltage applied to induce the desired change in dielectric constant may generally vary relative to the voltage at which the dielectric composition begins to become conductive upon application of an electric field ("breakdown voltage"), which can be determined in accordance with ASTM D149-13 at a temperature of 25° C. In most embodiments, the applied DC bias voltage is about 50% or less, in some embodiments, about 30% or less, and in some embodiments, from about 0.5% to about 10% of the breakdown voltage of the dielectric composition. The applied DC bias voltage may, for instance, range from about 0.5 to about 100 V, in some embodiments from about 1 to about 80 V, and in some embodiments, from about 1 to about 50 V. The applied bias field may likewise range from about 0.2 to about 50 V/μm, in some embodiments from about 0.5 to about 40 V/μm, and in some embodiments, from about 0.5 to about 25 V/μm.

Figure 10:
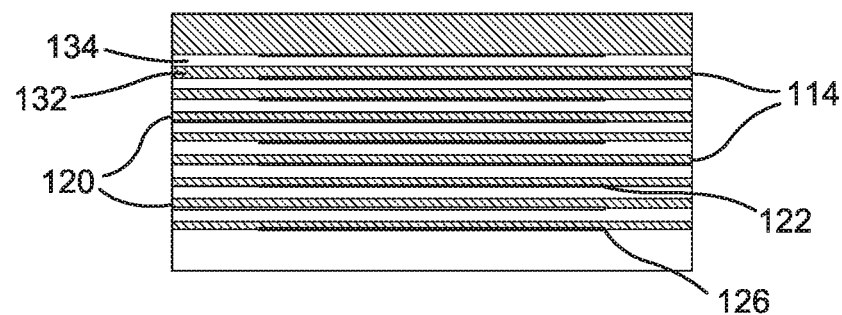
FIG. 10 illustrates a sectional view of an exemplary embodiment of a compositionally blended biased multilayer capacitor in accordance with presently disclosed subject matter.

Any of a variety of tunable dielectric materials may generally be employed as is known in the art. Particularly suitable materials are dielectrics whose base composition includes one or more ferroelectric base phases, such as perovskites, tungsten bronze materials (e.g., barium sodium niobate), layered structure materials (e.g., bismuth titanate). Suitable perovskites may include, for instance, barium titanate and related solid solutions (e.g., barium-strontium titanate, barium calcium titanate, barium zirconate titanate, barium strontium zirconate titanate, barium calcium zirconate titanate, etc.), lead titanate and related solid solutions (e.g., lead zirconate titanate, lead lanthanum zirconate titanate), sodium bismuth titanate, and so forth. In one particular embodiment, for instance, barium strontium titanate ("BSTO") of the formula $Ba_xSr_{1-x}TiO_3$ may be employed, wherein x is from 0 to 1, in some embodiments from about 0.15 to about 0.65, and in some embodiments, from about from 0.25 to about 0.6. Other electronically tunable dielectric materials may be used partially or entirely in place of barium strontium titanate. For instance, one example is $Ba_xCa_{1-x}TiO_3$, wherein x is from about 0.2 to about 0.8, and in some embodiments, from about 0.4 to about 0.6. Other suitable pervoskites may include $Pb_xZr_{1-x}TiO_3$ ("PZT") where x ranges from about 0.05 to about 0.4, lead lanthanum zirconium titanate ("PLZT"), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)_5KHb_2PO_4$. Still additional complex perovskites may include $A[B1_{1/3}B2_{2/3}]O_3$ materials, where A is $Ba_xSr_{1-x}$ (x can be a value from 0 to 1); B1 is $Mg_yZn_{1-y}$ (y can be a value from 0 to 1); B2 is $Ta_zNb_{1-z}$ (z can be a value from 0 to 1). A potential dielectric material of interest may be formed by combining two end-member compositions in alternating layers, as shown in the exemplary embodiment of FIG. 10. Such end-member compositions may be chemically similar, but differ in the ratios of A-site dopants as discussed above. For example, composition 1 (132 in FIG. 10) may be a perovskite compound of the general formula $(A1_x, A2_{(1-x)})BO_3$ and composition 2 (134) may be a perovskite of the general formula $(A1_y, A2_{(1-y)})BO_3$, where A1 and A2 are from Ba, Sr, Mg, and Ca; the potential B-site members are Zr, Ti and Sn, and "x" and "y" denote the mole fraction of each component. A specific example for compound 1 may be $(Ba_{0.8} Sr_{0.2})TiO_3$ and compound 2 may be $(Ba_{0.6}Sr_{0.4})TiO_3$. These two compounds may be combined in alternating layers in a sintered multilayer capacitor with tunable electrode structures, as shown in FIG. 10, such that the dielectric properties of each material are superimposed. If desired, the pervoskite material may also be doped with rare earth oxides ("REO"), such as in an amount less than or equal to 5.0 mole percent, and more preferably from 0.1 to 1 mole percent. Suitable rare earth oxide dopants for this purpose may include, for instance, scandium, yttrium, lanthanum, cerium, praseodymium, neodymium, promethium, samarium, europium, gadolinium, terbium, dysprosium, holmium, erbium, thulium, ytterbium, and lutetium.

Regardless of the particular material employed, the use of a tunable dielectric material can allow for the capacitance of the resulting capacitor to be tuned by applying a DC bias voltage through bias terminations. More particularly, the capacitor contains a set of first active electrodes that are in electrical contact with a first active termination (e.g., input termination) and a set of second active electrodes that are in electrical contact with a second active termination (e.g., output termination). The capacitor also contains a set of first DC bias electrodes that are in electrical contact with a first DC bias termination and a set of second DC bias electrodes that are in electrical contact with a second DC bias termination. When provided in a circuit, a DC power source (e.g., battery, constant voltage power supply, multiple output power supply, DC-DC converters, etc.) can provide a DC bias to the capacitor through the first and second bias terminations, which are typically bipolar in that they have an opposite polarity. The electrodes and terminations may be formed from any of a variety of different metals as is known in the art, such as precious metals (e.g., silver, gold, palladium, platinum, etc.), base metals (e.g., copper, tin, nickel, etc.), and so forth, as well as various combinations thereof. The dielectric layers are interposed between the respective active electrode and bias electrodes.

Figure 11:
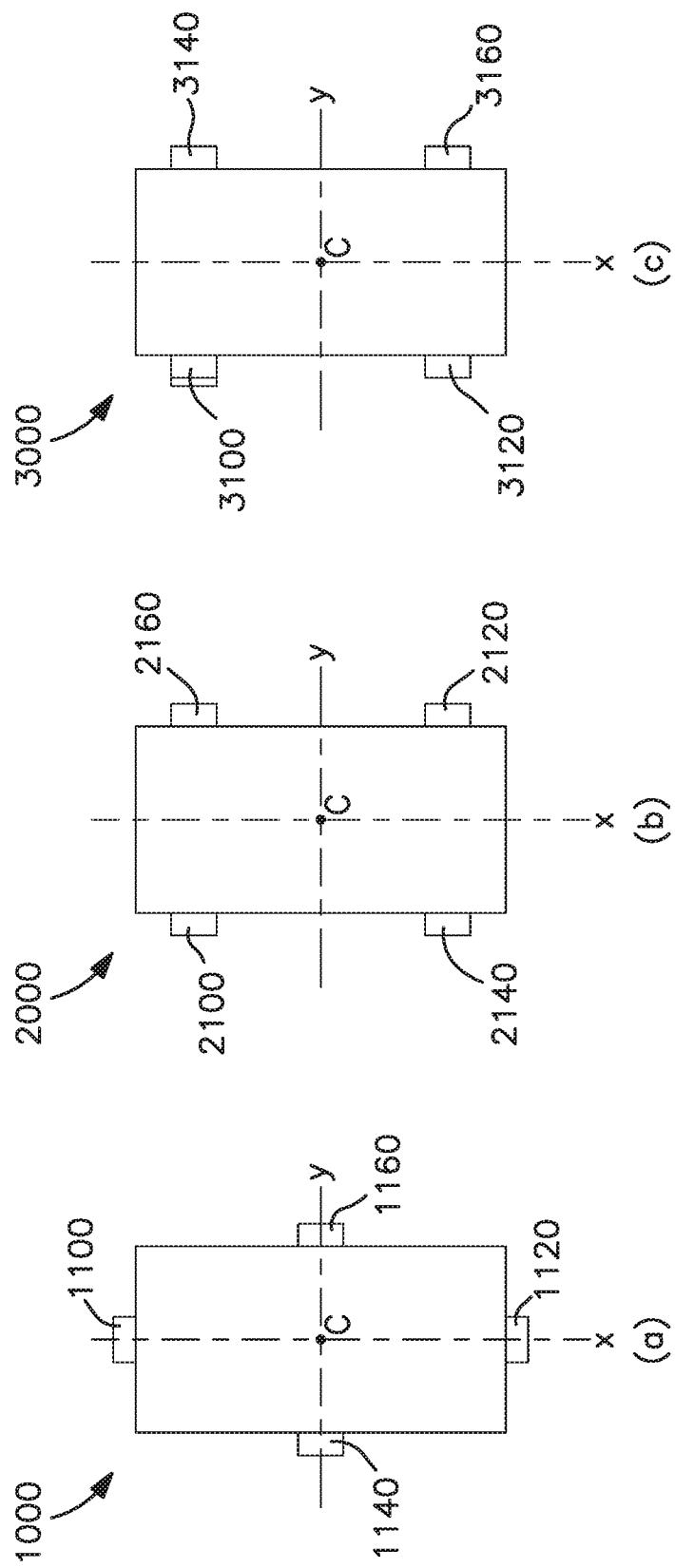
FIGS. 11A-11C illustrate, respectively, various symmetric orientations that may be employed for the active and bias terminations in certain embodiments of the present invention.

Although not necessarily required, it is typically desired that the active and DC bias terminations are disposed symmetrically about an axis of the capacitor. For example, in one embodiment, the capacitor may contain opposing first and second end regions that are spaced apart in a longitudinal direction and opposing first and side regions that are spaced apart in a lateral direction. In certain embodiments, the active terminations may be located at respective end regions of the capacitor while the DC bias terminations may be located at respective side regions of the capacitor. When symmetrically arranged, the active terminations and/or DC bias terminations may be spaced equidistant from a longitudinal and/or lateral axis extending through the geometric center of the capacitor. Referring to FIG. 11(a), for example, one embodiment of a capacitor 1000 is shown that contains a longitudinal axis "x" and a lateral axis "y" that are perpendicular to each other and extend through a geometrical center "C." In this particular embodiment, the capacitor 1000 contains first and second active terminations 1100 and 1120, respectively, which are located at end regions of the capacitor 1000 and centered about both the axes "x" and "y." Similarly, the capacitor 1000 contains first and second bias terminations 1140 and 1160 that are located at side regions of the capacitor 1000 and also centered about both the axes "x" and "y."

In certain embodiments, it may also be desired to locate two or more terminations on the same side of the capacitor. In FIG. 11(b), for instance, one embodiment of a capacitor 2000 is shown that contains a first active termination 2100 and second active termination 2140 that are located on the same side region. The capacitor 2000 also contains a first bias termination 2160 and a second bias termination 2120 that are both located on another side region opposite to that of the active terminations. Despite being located only on the side regions, the active terminations 2100 and 2140 are still symmetrically arranged in that they are both positioned equidistant from the axes "x" and "y." Similarly, the bias terminations 2160 and 2120 that are also located equidistant from the axes "x" and "y." In the above-referenced embodiments, the first active termination and first bias termination are positioned opposite to the respective second active termination and second bias termination. Of course, this is by no means required. In FIG. 11(c), for instance, a capacitor 3000 is shown that contains first and second active electrode terminations 3100 and 3160, respectively, which are located at opposite side regions in an offset configuration. Nevertheless, the first active termination 3100 and second active termination 3160 are still symmetrically arranged in that they are both positioned equidistant from the axes "x" and "y." Similarly, the capacitor 3000 also contains first and second bias terminations 3120 and 3140 that are located at opposite side regions in an offset configuration yet equidistant from the axes "x" and "y."

Regardless of the particular configuration employed, the present inventors have discovered that selective control over the nature of the tunable dielectric material, the active terminations, and the bias terminations, a capacitor can be achieved that exhibits excellent tunability over a wide range of capacitance and voltage values. FIG. 1, for instance, illustrates in graphic form the change in capacitance that can be achieved over a range of normalized biasing voltage changes. Specifically, the horizontal axis graphs a normalized biased voltage as a percentage of the rated voltage of a device, such as from 0% to 150%. As shown, a corresponding change in device effective capacitance is graphed on the vertical axis, as a percentage of change from the capacitance value without any bias. As shown by the graph of such FIG. 1, an increase of 150% in the normalized bias voltage amount approaches towards an 80% decrease in the no-bias capacitance value, along a relatively straight-line curve, as illustrated. In such way, a voltage tunable capacitor device in accordance with the presently disclosed subject matter helps to maximize efficiency over a range of use conditions.

In certain embodiments, for instance, the capacitance value may be controlled within a wider range of values than conventionally thought possible. For example, the capacitance can be tuned within a range of 0.5 to 50,000,000 picoFarads ("pF"). Thus, the capacitor can be used in applications where a high capacitance is required, such as at values of 100 pF or more, in some embodiments about 1,000 pF or more, in some embodiments from about 10,000 to about 2,000,000 pF, and in some embodiments from about 100,000 to 1,000,000 pF. Likewise, in other embodiments, the capacitor can be used in applications where a low capacitance is required, such as at values of less than 100 pF, in some embodiments about 50 pF or more, in some embodiments from about 0.5 to about 30 pF, and in some embodiments from about 1 to about 10 pF. The degree to which the capacitance can be tuned may vary as desired. For example, the capacitance may be adjusted by a value of from about 10% to about 100%, in some embodiments from about 20% to about 90%, and in some embodiments, from about 30% to about 80% of its initial value. Capacitance may be determined using an Agilent 4294A impedance analyzer at a frequency of 1 kHz or 1 MHz, temperature of about 25° C., and at a fixed oscillation of 500 mV.

Figure 2A:
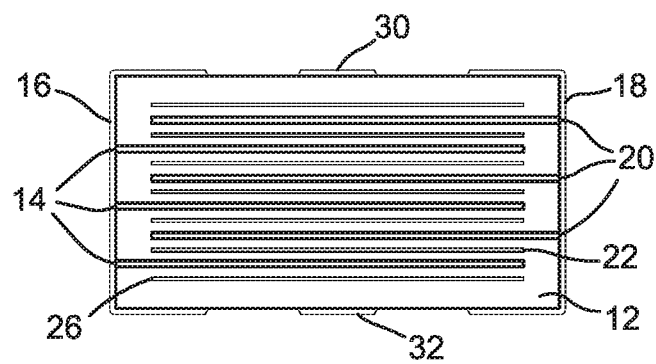
FIGS. 2A, 2B, and 2C illustrate, respectively, a sectional view, an exploded plan view, and an exploded perspective view, of an exemplary embodiment of a four-termination biased multilayer capacitor in accordance with presently disclosed subject matter.
Figure 2B:
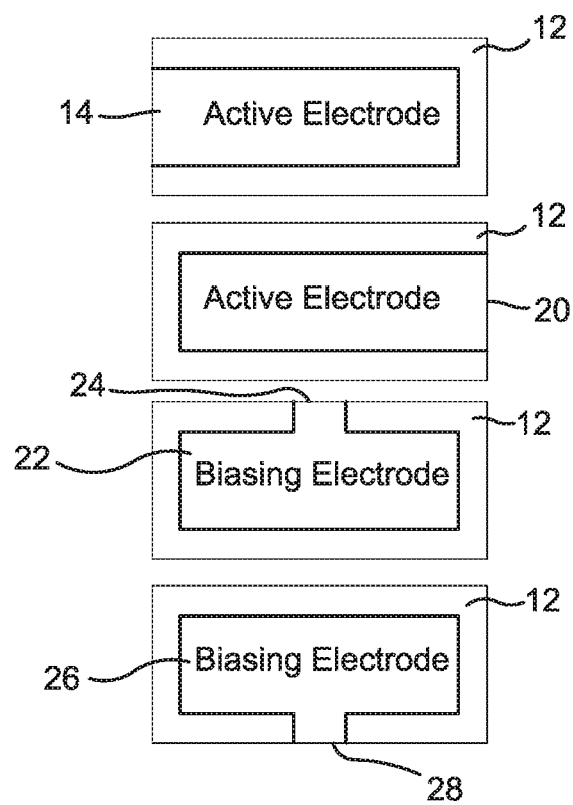
Figure 2C:
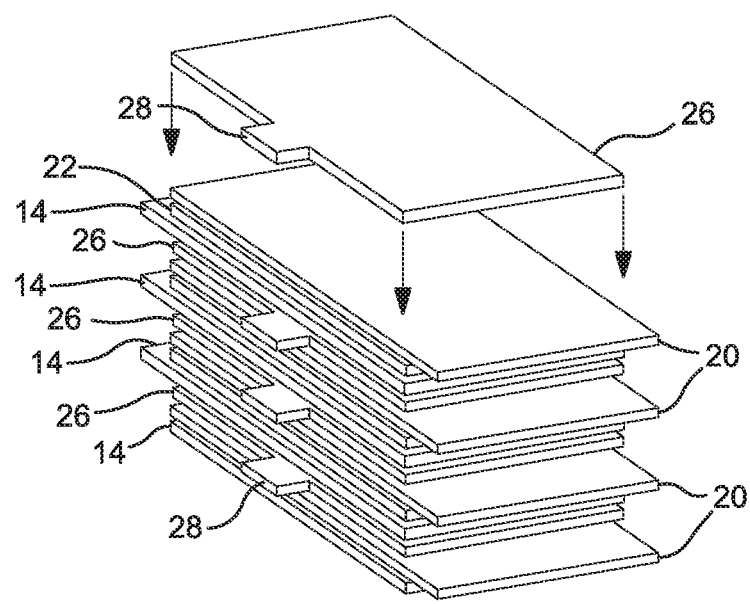
Figure 2D:
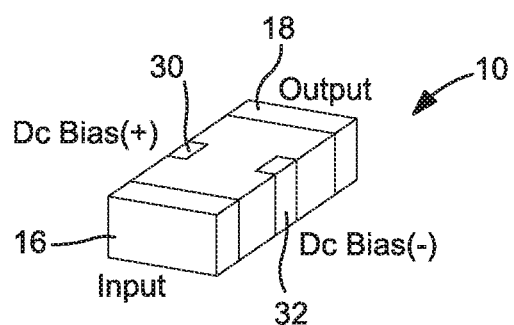
FIG. 2D illustrates a generally side, top, and end perspective view of an assembled device in accordance with the exemplary embodiment of present FIGS. 2A through 2C.
Figure 2E:
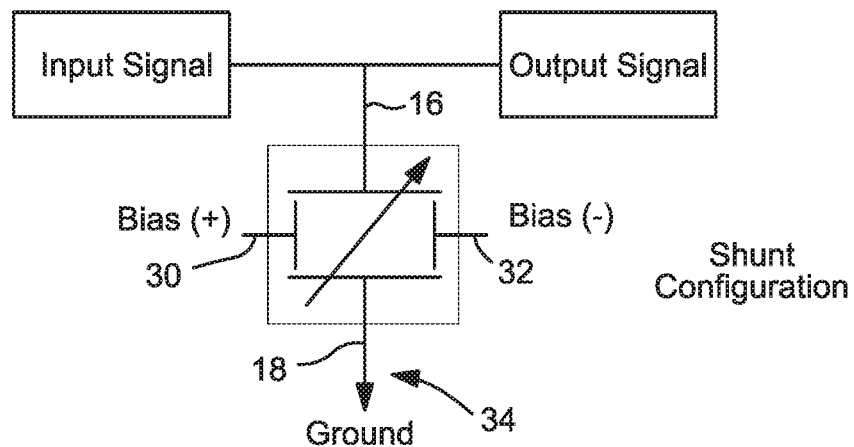
FIGS. 2E and 2F illustrate, respectively, shunt configuration and series configuration representative diagrams of the exemplary embodiment of present FIGS. 2A through 2D.
Figure 2F:
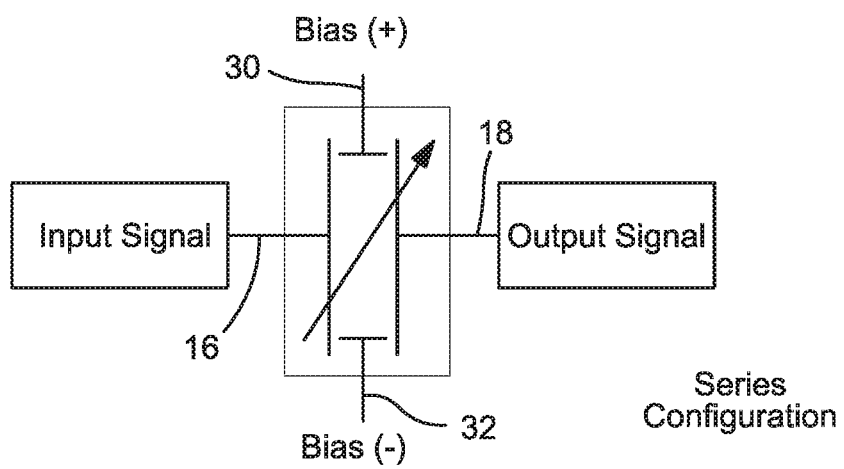

Referring now to FIGS. 2A-2D, one particular embodiment of a capacitor 10 that can be formed in accordance with the present invention will now be described in further detail. As shown, the capacitor 10 contains a plurality of dielectric layers 12 that are stacked alternately relative to two separate sets of active electrodes 14 and 20 and two separate sets of bias electrodes 22 and 26. The capacitor may be a six-sided body, such as a rectangular-shaped body. In the illustrated embodiment, a first active termination 16 is electrically connected to the first active electrodes 14 and a second active termination 18 is electrically connected to the second active electrodes 20. The first bias electrodes 22 are electrically connected with a first DC bias (+) termination 30 via extending members 24 (e.g., tabs) that extend to the side of the capacitor 10. Similarly, the second bias electrodes 26 are electrically connected with a second DC bias (−) termination 32 via extending members 28. Accordingly, the resulting capacitor 10 contains four (4) separate terminations. FIGS. 2E and 2F illustrate, respectively, shunt configuration and series configuration representative diagrams of the exemplary embodiment of present FIGS. 2A through 2D. As shown, a ground 34 is also provided relative to the biasing inputs is shown for the shunt configuration.

Figure 3A:
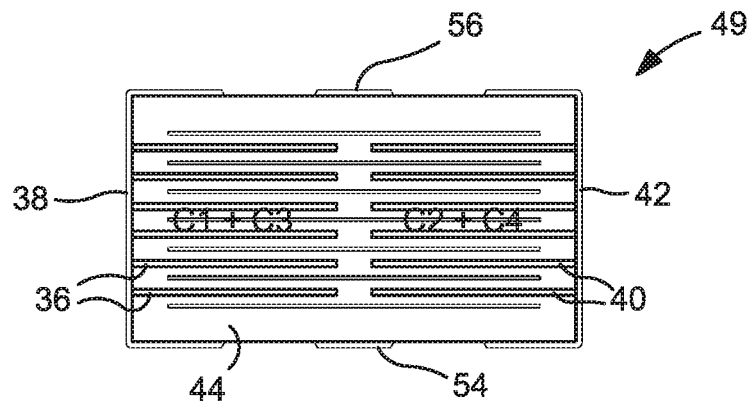
FIGS. 3A, 3B, and 3C illustrate, respectively, a sectional view, an exploded plan view, and an exploded perspective view, of an exemplary embodiment of a four-termination tunable cascade configuration multilayer capacitor in accordance with presently disclosed subject matter.
Figure 3B:
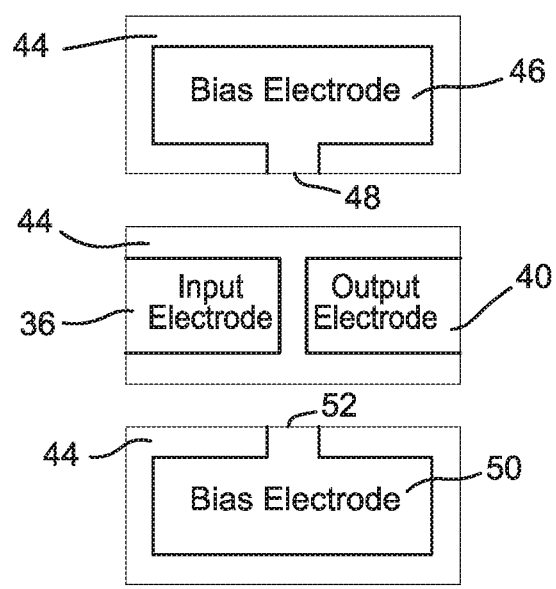
Figure 3C:
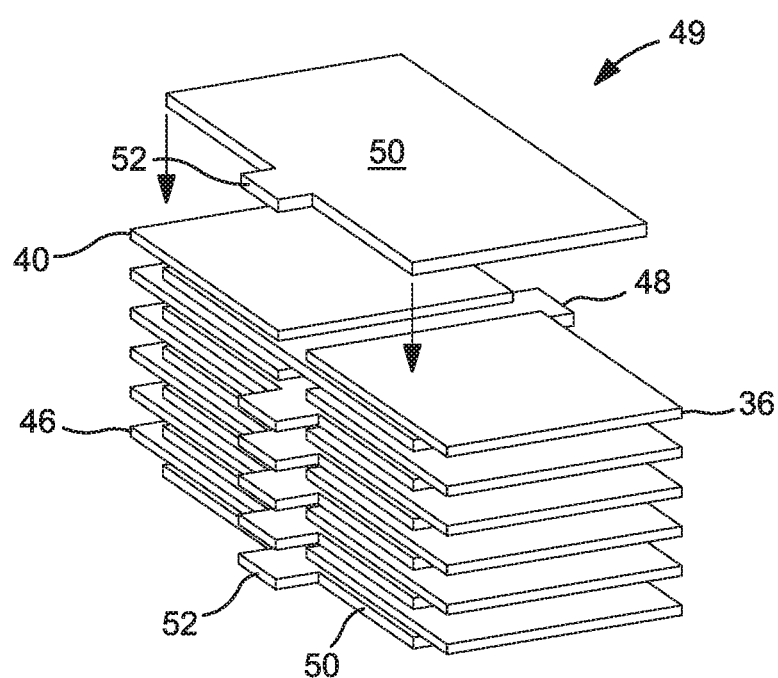
Figure 3D:
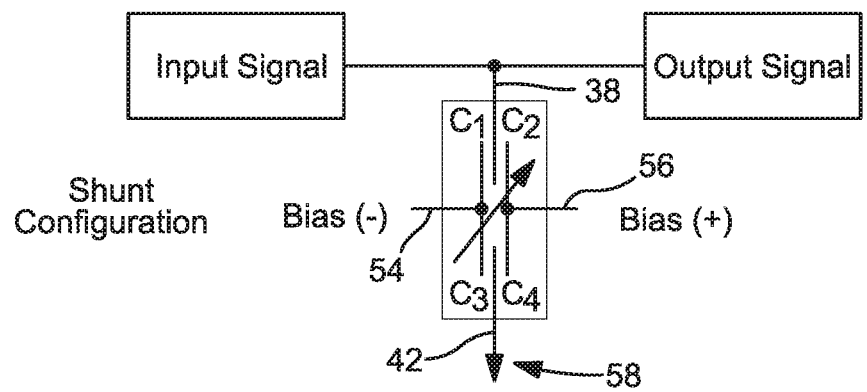
FIGS. 3D and 3E illustrate, respectively, shunt configuration and series configuration representative diagrams of the exemplary embodiment of present FIGS. 3A through 3C.
Figure 3E:
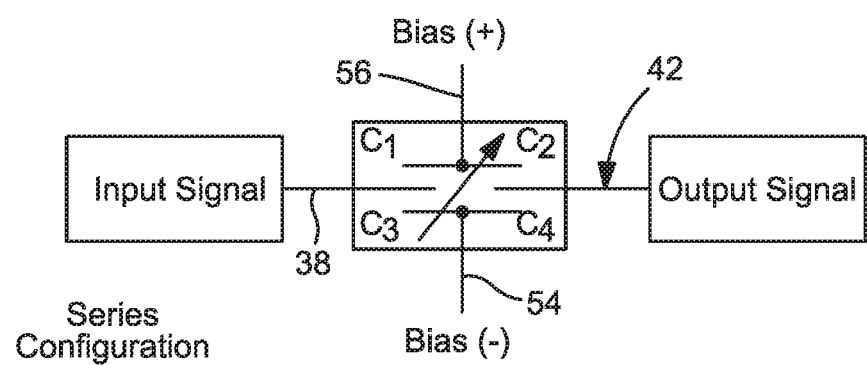

In the embodiment discussed above, the active electrodes are stacked so that each alternate electrode connects to opposite terminations. In certain embodiments, the alternating layers may be connected to the same terminations through the use of a "cascade" configuration in which each set of active electrodes is spaced apart laterally rather than in a stacked manner. One embodiment of such a cascaded capacitor 49 is shown in FIGS. 3A-3C. As depicted, the capacitor 49 contains a plurality of dielectric layers 44 that are arranged relative to two separate sets of active electrodes 36 and 40 and two separate sets of bias electrodes 46 and 50. In the illustrated embodiment, this instance, a first active termination 38 is electrically connected with the first active electrodes 36 and a second active termination 42 is electrically connected to the second active electrodes 40. The first bias electrodes 46 are electrically connected with a first DC bias (−) termination 54 via extending members 48 that extend to the side of the capacitor 49. Similarly, the second bias electrodes 50 are electrically connected with a second DC bias (+) termination 56 via extending members 52. FIGS. 3D and 3E illustrate, respectively, shunt configuration and series configuration representative diagrams of the exemplary embodiment of present FIGS. 3A through 3C. As shown, a ground 58 is also provided relative to the biasing inputs is shown for the shunt configuration.

Figure 4A:
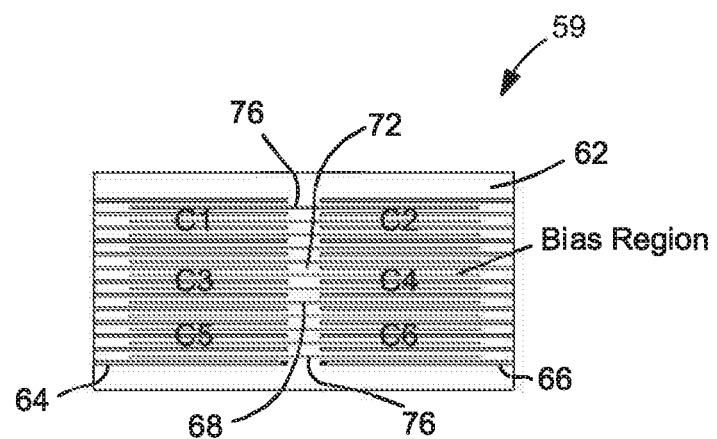
FIGS. 4A and 4B illustrate, respectively, a sectional view and an exploded plan view of an exemplary embodiment of a four-termination tunable partially biased configuration multilayer capacitor in accordance with presently disclosed subject matter.
Figure 4B:
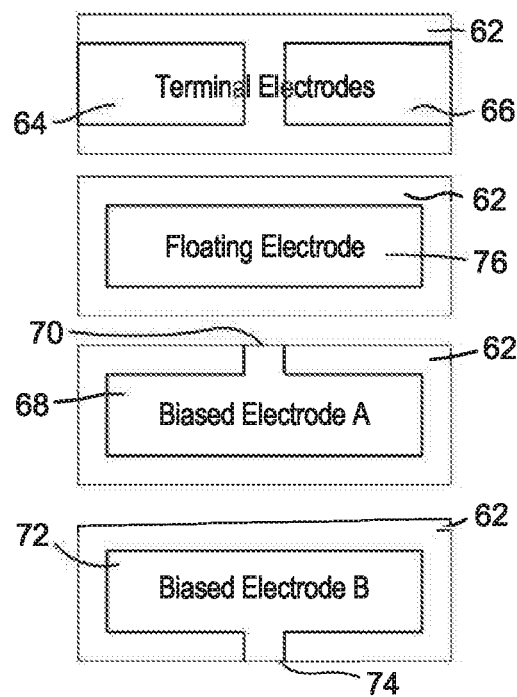
Figure 4C:
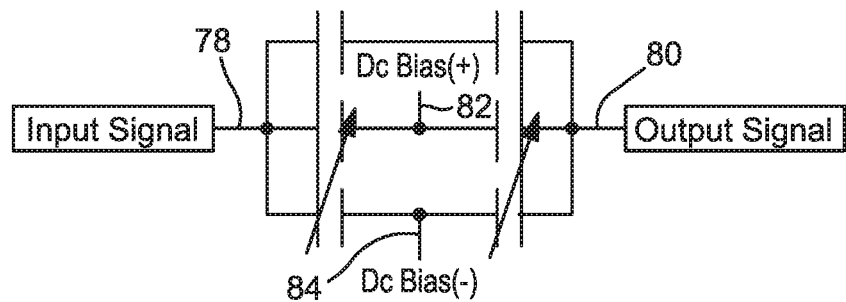
FIG. 4C illustrates a representative diagram of the exemplary embodiment of present FIGS. 4A and 4B.

FIGS. 4A-4C illustrate another embodiment of a capacitor 59 that may be formed in a partially cascaded configuration in accordance with the present invention. The capacitor 59 is considered "partially cascaded" because only a partial region 60 of the total active capacitance region is biased (see FIG. 4A). The addition of biased floating electrodes as illustrated allows application of external voltage to change the dielectric properties of a total capacitance to be determined by other factors and features. As shown by such figures, dielectric layers 62 may be stacked alternately relative to first and second sets of active electrodes 64 and 66, first and second sets of bias electrodes 68 and 72, and a plurality of floating electrodes 76. The first active electrodes 64 are electrically connected with a first active termination 78 while the second active electrodes 66 are electrically connected with a second active termination 80. The first bias electrodes 68 are electrically connected with a first DC bias (+) termination 82 via extending members 70 that extend to the side of the capacitor 59. Similarly, the second bias electrodes 72 are electrically connected with a second DC bias (−) termination 84 via extending members 74.

Figure 7B:
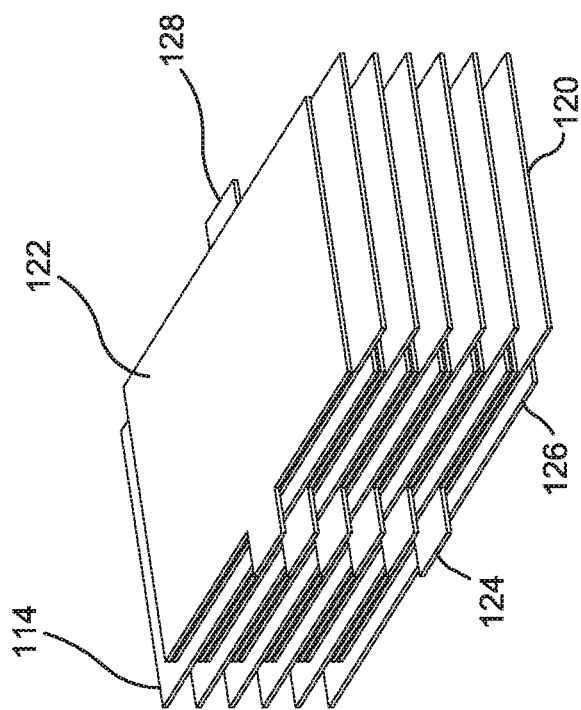
FIGS. 7A and 7B, illustrate, respectively, a sectional view and a partially expanded perspective view, of an exemplary embodiment of a 1:1 ratio overlapped symmetric design of a biased multilayer capacitor in accordance with presently disclosed subject matter.
Figure 7A:
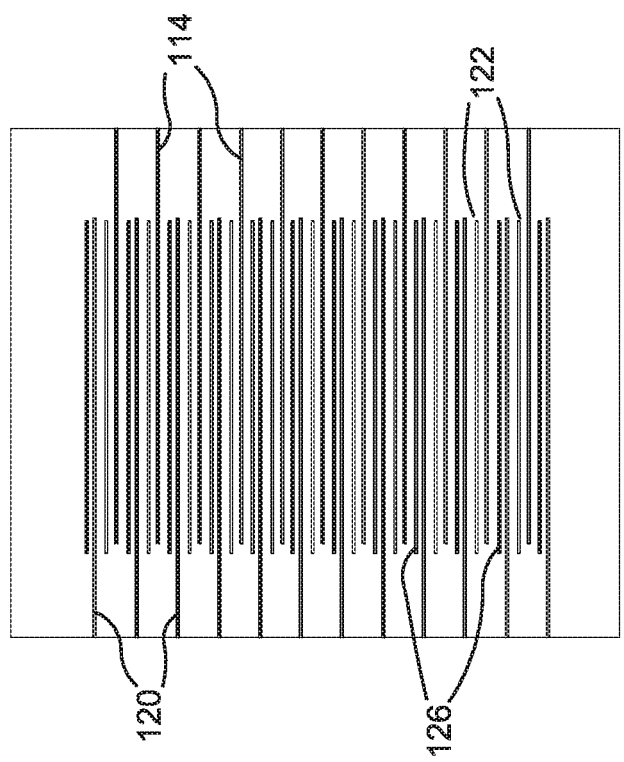

Yet another embodiment of the present invention is shown in FIGS. 7A and 7B. In this embodiment, first and second sets of active electrodes 114 and 120, respectively, are stacked in an alternating 1:1 ratio pattern with first and second sets of bias electrodes 122 and 126, respectively. Respective leads 124 and 128 are illustrated in the representation of application FIG. 7B.

Figure 6:
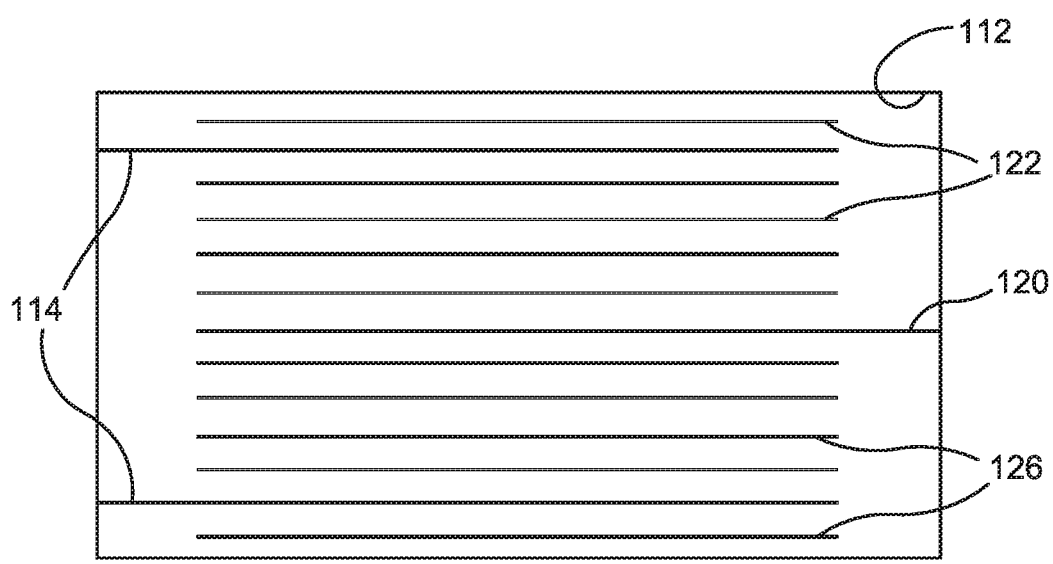
FIG. 6 illustrates a sectional view of an exemplary embodiment of a biased asymmetrical multilayer capacitor in accordance with presently disclosed subject matter.

In the embodiments discussed above, the electrodes are generally employed in a "symmetric" configuration in that the distance (or dielectric thickness) between the first active electrode and the second active electrode is generally the same as the distance between the first bias electrode and the second bias electrode. In certain embodiments, however, it may be desired to vary this thickness to achieve an "asymmetric" configuration. For example, the distance between the first and second active electrodes may be less than the distance between the first and second bias electrodes. In yet other embodiments, the distance between the first and second active electrodes may be greater than the distance between the first and second bias electrodes. Among other things, this may increase the DC field applied for a given level of applied DC bias, which will increase the level of tunability for a given DC bias voltage. Such an arrangement may also allow relatively larger tunability for relatively more modest DC voltages and the use of materials with modest tunability (with potentially lower losses and temperature/frequency variability). While such an asymmetric configuration can be accomplished in a variety of ways, it is typically desired to use additional "floating" bias electrodes between each pair of active electrodes. Referring to FIG. 6, for instance, one embodiment of such an asymmetric capacitor is shown that contains first and second active electrodes 114 and 120, respectively, in conjunction with first and second bias electrodes 122 and 126, respectively.

Figure 9:
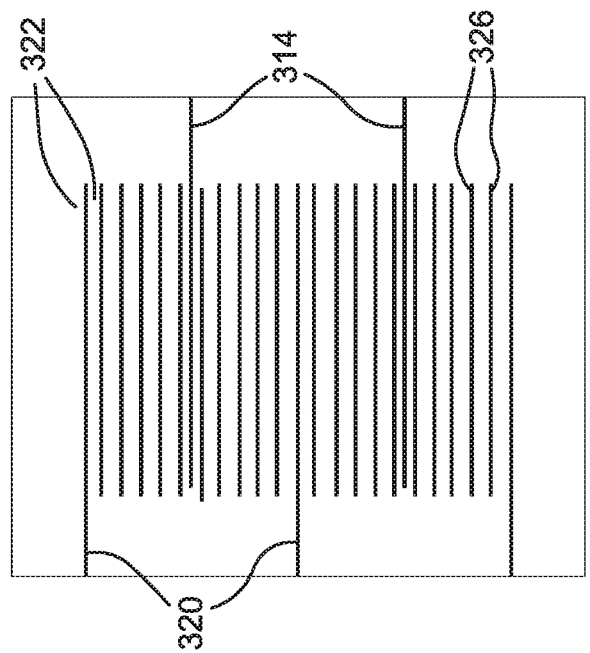
FIG. 9 illustrates a sectional view of an exemplary embodiment of an 11:1 ratio shielded asymmetric design of a biased multilayer capacitor in accordance with presently disclosed subject matter.
Figure 8:
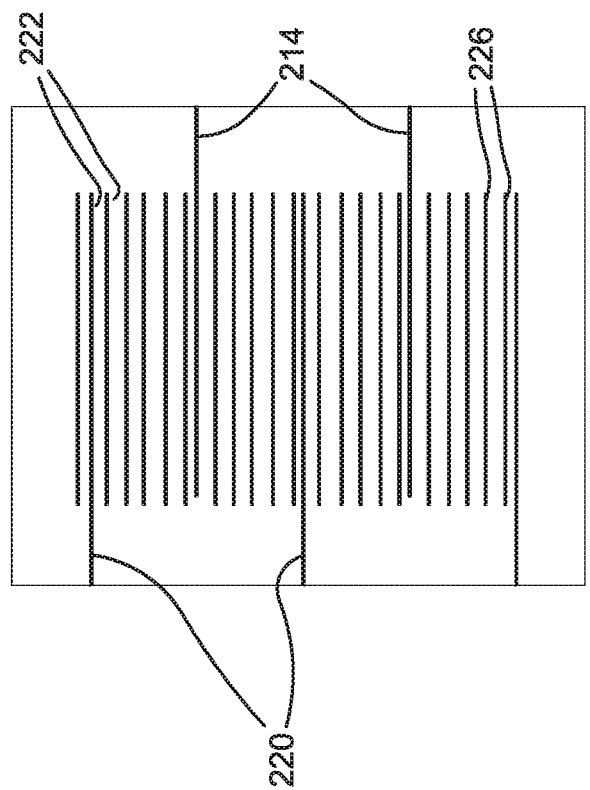
FIG. 8 illustrates a sectional view of an exemplary embodiment of an 11:1 ratio non-shielded asymmetric design of a biased multilayer capacitor in accordance with presently disclosed subject matter.

FIG. 8 illustrates another embodiment of any asymmetric capacitor in which every 11$^{th}$ electrode is an active electrode instead of a bias electrode (11:1 ratio design). In this case, each such respective ac (or active) electrode is bounded by DC electrodes (e.g., bias electrodes) of opposing polarities. Thus, the biasing field is generated across the AC electrode itself. Such structure also allows capacitive coupling between the AC signal and both polarities of DC bias voltage, and vice versa. In other words, every AC electrode (either 214 or 220 in FIG. 8) is capacitively coupled to both polarities of the bias voltage (both 222 and 226), and every DC electrode (either 222 or 226) is coupled to both polarities of AC voltage (both 214 and 220). FIG. 9 illustrates a sectional view of an exemplary embodiment of an 11:1 ratio "shielded" asymmetric design of a biased multilayer capacitor in accordance with presently disclosed subject matter. This is similar to the example shown in FIG. 8 except that each respective polarity of AC electrode is bounded by dc electrodes of only one polarity. The material between DC electrodes 322 and 326 of the same polarity would have no tuning, but they potentially provide shielding to the ac signal, reducing associated noise, which ac signal is associated with AC electrodes 314 and 320. Such arrangement also means that every respective polarity AC electrode 314 and 320 may only be coupled to a single polarity of respective DC electrode 326 and 322, respectively, and conversely every respective DC electrode 326 and 322 may be coupled to a single polarity AC electrode 314 and 320, respectively.

Figure 5:
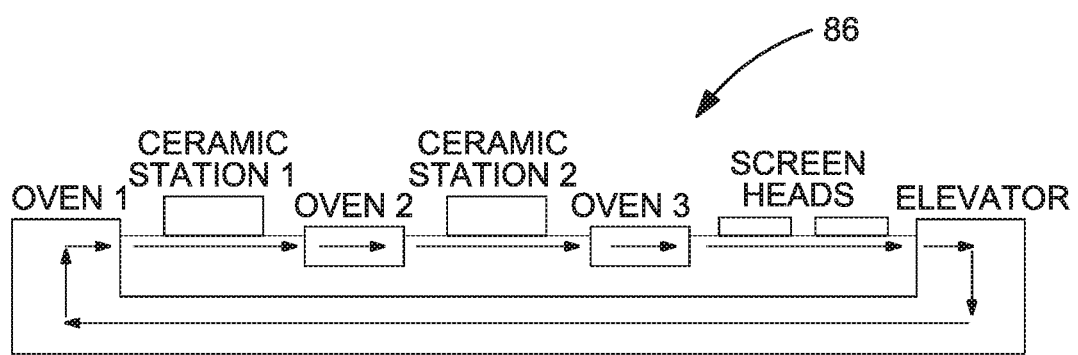
FIG. 5 represents a chip manufacturing automated process (CMAP) exemplary embodiment in accordance with presently disclosed subject matter, usable in manufacturing device exemplary embodiments as disclosed herewith.

The presently disclosed subject matter equally encompasses associated and/or corresponding methodologies for improved voltage tunable devices, including for example, production of such devices, as well as their use in combination with associated circuitry. As further example, FIG. 5 represents a chip manufacturing automated process (CMAP) 86, which is usable in conjunction with manufacturing device exemplary embodiments as disclosed herewith. As shown, the process 86 may include a number of successive stages, involving in some instances three ovens with interceding ceramic stations or other steps/facets such as the use of screen heads or elevator and conveyor features, as representatively shown. Those of ordinary skill in the art will understand that the exact provision of successive steps will depend on which of the exemplary device embodiments disclosed herewith (or modifications thereof) are being produced. Also, the individual steps indicated are only intended as representative of the indicated type of step, and do not denote required use of other aspects beyond the general nature of the steps indicated. For example, the screen head step may involve the use of a stainless steel screen together with an electrode paste for screen pasting of electrode layers, or other technologies for such step may be practices. For example, more conventional steps of alternate stacking and laminating (with tapes) may be practiced. In either process (or others), those of ordinary skill in the art will recognize that selected steps may be practiced to produce a particular design selected for a given application of the presently disclosed subject matter.

The capacitor of the present invention may be employed in a wide variety of applications. For example, circuitry may be enabled for tuning the oscillation frequency of a switch mode power supply. Through the use of the capacitor of the present invention, better tunability can be selectively obtained at more modest dc voltages (i.e., biasing voltages), while allowing the use of materials with relatively more modest tunability but with potentially lower losses and lower temperature/frequency variability. Other suitable applications may include, for instance, waveguides, RF applications (e.g., delay lines), antenna structures, filters, matching networks, resonant circuits and other applications.

What is claimed is:

1. A tunable multilayer capacitor comprising:
first active electrodes that are in electrical contact with a first active termination and second active electrodes that are in electrical contact with a second active termination;
first DC bias electrodes that are in electrical contact with a first DC bias termination and alternating second DC bias electrodes that are in electrical contact with a second DC bias termination;

one or more floating electrodes that are free of connection with the first active termination, second active termination, first DC bias termination, and second DC bias termination; and a plurality of dielectric layers disposed between the one or more floating electrodes, between the first and second active electrodes, and between the alternating first and second DC bias electrodes, wherein at least a portion of the dielectric layers contains a tunable dielectric material that exhibits a variable dielectric constant upon application of an applied voltage.

2. The capacitor of claim 1, wherein the tunable dielectric material has a voltage tunability coefficient of from about 10% to about 90%, wherein the voltage tunability coefficient is determined according to the following general equation:

$$T=100\times(\varepsilon_0-\varepsilon_V)/\varepsilon_0$$

wherein,

T is the voltage tunability coefficient;

$\varepsilon_0$ is a static dielectric constant of the material without the applied voltage; and $\varepsilon_V$ is a variable dielectric constant of the material after application of the applied voltage.

3. The capacitor of claim 2, wherein the static dielectric constant of the tunable dielectric material is from about 100 to about 10,000 as determined in accordance with ASTM D2149-13 at an operating temperature of 25° C. and frequency of 1 kHz.

4. The capacitor of claim 1, wherein the tunable dielectric material includes one or more ferroelectric base phases.

5. The capacitor of claim 4, wherein the tunable dielectric material is a perovskite, tungsten bronze material, layered structure material, or a combination thereof.

6. The capacitor of claim 5, wherein the pervoskite includes a barium strontium titanate of the formula $Ba_xCa_{1-x}TiO_3$, wherein x is from 0 to 1.

7. The capacitor of claim 1, wherein the first and second DC bias terminations have an opposite polarity.

8. The capacitor of claim 1, wherein the first and second active terminations and the first and second DC bias terminations are disposed symmetrically about the capacitor.

9. The capacitor of claim 1, wherein the capacitor contains opposing first and second end regions that are spaced apart in a longitudinal direction and opposing first and side regions that are spaced apart in a lateral direction.

10. The capacitor of claim 9, wherein the first and second active terminations are located at respective end regions of the capacitor and the first and second DC bias terminations are located at respective side regions of the capacitor.

11. The capacitor of claim 10, wherein the first and second active terminations are spaced equidistant from a longitudinal axis and lateral axis extending through a geometric center of the capacitor, and further wherein the first and second DC bias terminations are spaced equidistant from a longitudinal axis and lateral axis extending through a geometric center of the capacitor.

12. The capacitor of claim 9, wherein the first active termination and second active termination are located on a side region, and wherein the first DC bias termination and the second DC bias termination are both located on another side region opposite to the active terminations.

13. The capacitor of claim 12, wherein the first and second active terminations are spaced equidistant from a longitudinal axis and lateral axis extending through a geometric center of the capacitor, and further wherein the first and second bias DC terminations are spaced equidistant from a longitudinal axis and lateral axis extending through a geometric center of the capacitor.

14. The capacitor of claim 9, wherein the first and second active electrode terminations are located at opposite side regions in an offset configuration, and further wherein the first and second DC bias terminations are located at opposite side regions in an offset configuration.

15. The capacitor of claim 14, wherein the first and second active terminations are spaced equidistant from a longitudinal axis and lateral axis extending through a geometric center of the capacitor, and further wherein the first and second DC bias terminations are spaced equidistant from a longitudinal axis and lateral axis extending through a geometric center of the capacitor.

16. The capacitor of claim 1, wherein the capacitor is capable of being tuned to a capacitance value of about 100 pF or more.

17. The capacitor of claim 1, wherein the capacitor is capable of being tuned to a capacitance value of less than about 100 pF.

18. The capacitor of claim 1, wherein the first DC bias electrodes contain tabs extending to the first DC bias termination, the second DC bias electrodes contain tabs extending to the second DC bias termination, or a combination thereof.

19. The capacitor of claim 1, wherein the first active electrodes and the second active electrodes are evenly spaced apart by a first distance, and the first DC bias electrodes and second DC bias electrodes are evenly spaced apart by a second distance that is approximately the same as distance between the first DC bias electrodes and the second DC bias electrodes.

20. The capacitor of claim 1, wherein the first active electrodes and the second active electrodes are evenly spaced apart by a first distance, and the first DC bias electrodes and second DC bias electrodes are evenly spaced apart by a second distance that is greater than the first distance between the first DC bias electrodes and the second DC bias electrodes.

21. The capacitor of claim 1, wherein the first active electrodes and the second active electrodes are evenly spaced apart by a first distance, and the first DC bias electrodes and second DC bias electrodes are evenly spaced apart by a second distance that is less than the first distance between the first DC bias electrodes and the second DC bias electrodes.

22. A circuit comprising the capacitor of claim 1 and a power source that supplies a DC bias voltage to the capacitor through the first and second DC bias terminations.

23. A method for tuning the capacitor of claim 1 comprising supplying a DC bias voltage to the capacitor through the first and second DC bias terminations.

24. The method of claim 23, wherein the DC bias voltage is about 50% or less than a breakdown voltage of the tunable dielectric material in the capacitor.

25. The method of claim 23, wherein the DC bias voltage is from about 0.5 to about 100 V.

* * * * *